US012587373B2

(12) United States Patent
Bacco et al.

(10) Patent No.: US 12,587,373 B2
(45) Date of Patent: Mar. 24, 2026

(54) QUANTUM KEY DISTRIBUTION TRANSMITTER

(71) Applicant: QTI SRL, Florence (IT)

(72) Inventors: Davide Bacco, Codevigo (IT);
Francesco Saverio Cataliotti, Florence
(IT); Paolo De Natale, Prato (IT);
Tommaso Occhipinti, Vicenza (IT);
Ilaria Vagniluca, Florence (IT);
Alessandro Zavatta, Florence (IT)

(73) Assignee: QTI SRL, Florence (IT)

( * ) Notice: Subject to any disclaimer, the term of this
patent is extended or adjusted under 35
U.S.C. 154(b) by 0 days.

(21) Appl. No.: 18/280,960

(22) PCT Filed: Mar. 9, 2022

(86) PCT No.: PCT/EP2022/056067
§ 371 (c)(1),
(2) Date: Sep. 8, 2023

(87) PCT Pub. No.: WO2022/189523
PCT Pub. Date: Sep. 15, 2022

(65) Prior Publication Data
US 2024/0214189 A1     Jun. 27, 2024

(30) Foreign Application Priority Data

Mar. 9, 2021     (IT) ......................... 102021000005462

(51) Int. Cl.
*H04L 9/08*          (2006.01)
(52) U.S. Cl.
CPC ................................. *H04L 9/0852* (2013.01)

(58) Field of Classification Search
CPC ..................................................... H04L 9/0852
See application file for complete search history.

(56)                References Cited

U.S. PATENT DOCUMENTS 11,387,992 B2 *    7/2022   Kikawada ............. H04L 9/0858
2019/0222415 A1 *   7/2019   Kikawada ............. H04L 9/0858

OTHER PUBLICATIONS

Vagniluca I et al: "Efficient time-bin encoding for practical high-
dimensional quantum key distribution", arxiv.org, Cornell Univer-
sity Library, 201 Olin Library Cornell University Ithaca, NY 14853,
Apr. 7, 2020 (Apr. 7, 2020), XP081639441, p. 1-p. 6.
(Continued)

*Primary Examiner* — Baotran N To
(74) *Attorney, Agent, or Firm* — Carmel Patent Agency;
Robert Ballarini

(57)                ABSTRACT

A quantum key distribution transmitter for sending a quan-
tum key via a quantum channel via N-dimensional protocol,
including a p-dimensional time-bin protocol, includes:
a pulsed laser configured to emit a train of laser pulses,
each pulse having a random phase with respect to the
phase of the following pulse in the train,
a first intensity modulator configured to divide a pulse of
the train of pulses in a group of p consecutive sub-
pulses identical to each other;
a variable optical attenuator configured to reduce the
intensity of each sub-pulse of the group of p consecu-
tive sub-pulses;
a beam splitter comprising a first arm and a second arm,
the beam splitter being configured to receive the group
of p sub-pulses and split the group of p sub-pulses in a
first and second split groups of p sub-pulses identical to
each other in the first and second arms.

12 Claims, 8 Drawing Sheets

(56)         References Cited

OTHER PUBLICATIONS

Beatrice Da Lio et al: "Stable transmission of high-dimensional quantum states over a 2 km multicore fiber" arxiv.org, Cornell University Library, 201 Olin Library Cornell University Ithaca, NY 14853, Jan. 30, 2020 (Jan. 30, 2020), XP081588848.

"Quantum Key Distribution (QKD); Component characterization: characterizing opticalcomponents for QKD systems", Group Specification, European Telecommunications Standards Institute (ETSI), 650, Route Des Lucioles; F-06921 Sophia-Antipolis: France, vol. OKD, No. V1.1.1, May 1, 2016 (May 1, 2016).

Written Opinion in PCT/EP2022/056067 dated Jul. 4, 2022.

International Search Report in PCT/EP2022/056067 dated Jul. 4, 2022.

* cited by examiner

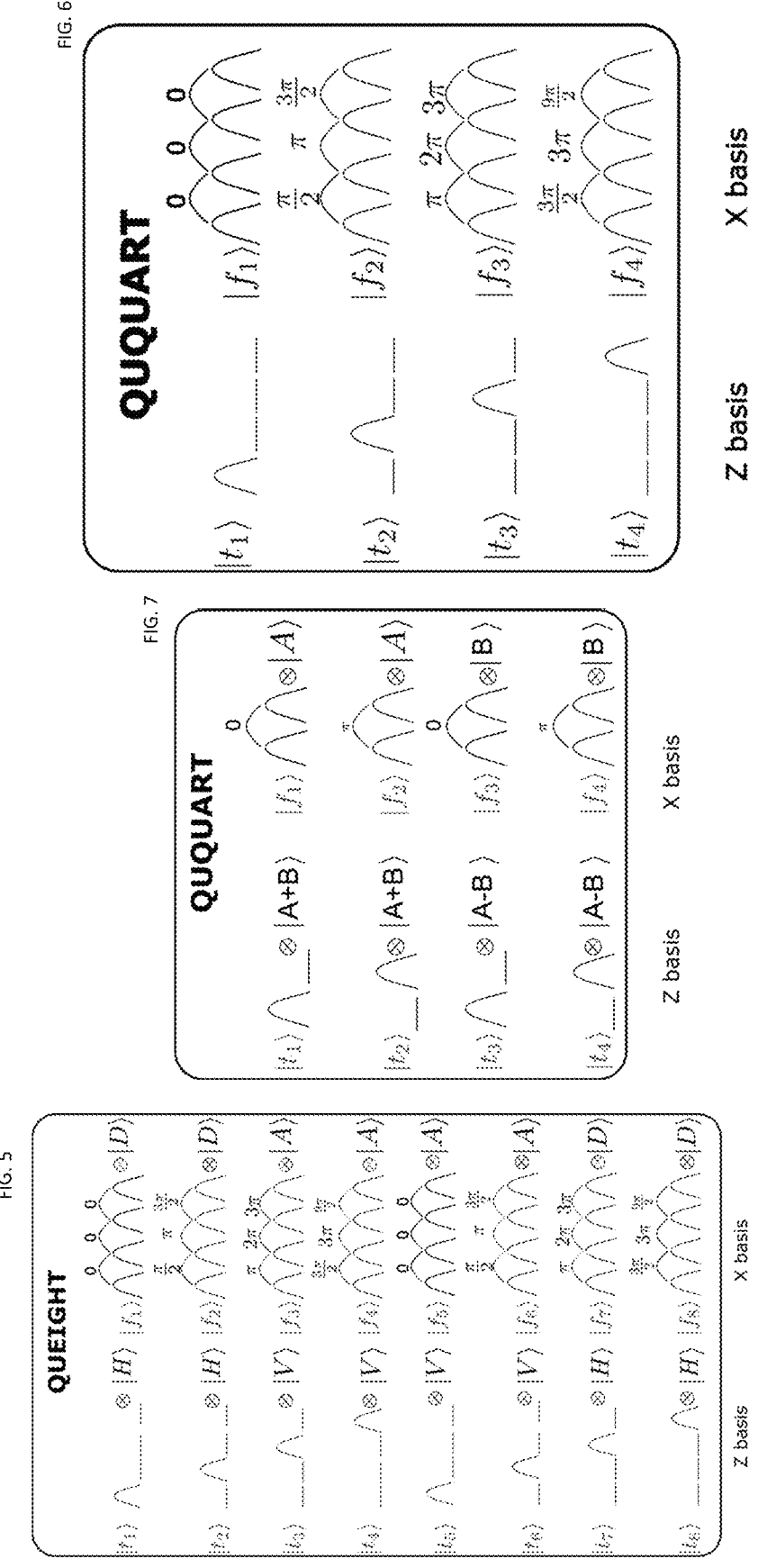

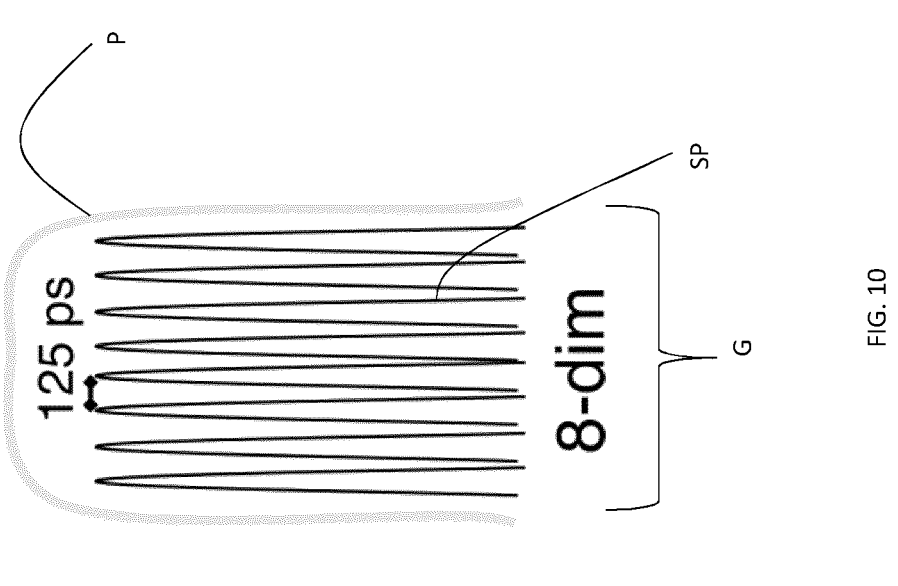
FIG. 10
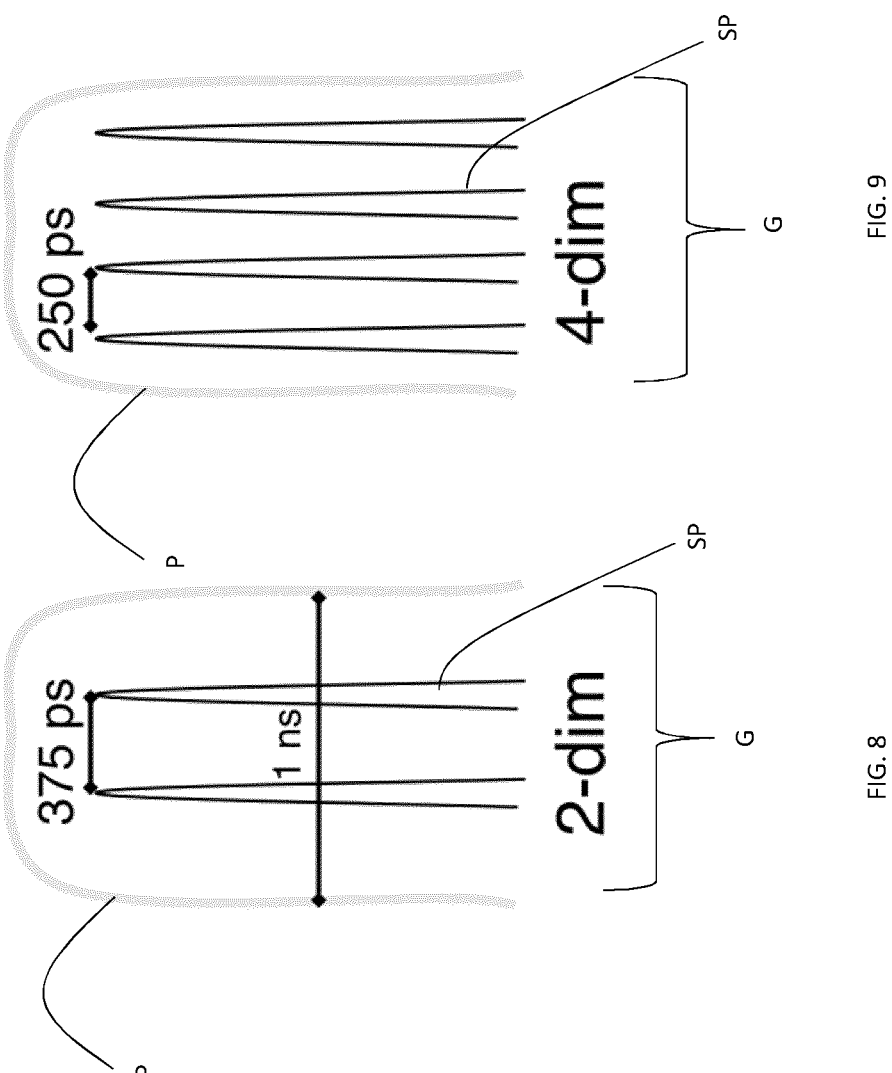
FIG. 9
FIG. 8

QUANTUM KEY DISTRIBUTION TRANSMITTER

FIELD OF THE INVENTION

The present invention relates to a quantum key distribution transmitter for sending a cryptographic key by using a quantum communication protocol with N-dimensional quantum states.

BACKGROUND

Quantum communications, by exploiting single photons or weak coherent pulses of light, give rise to novel types of applications, not possible with standard optical communication. For example, the possibility of distributing cryptographic keys in an unconditionally secure way is currently the most relevant application from a commercial point of view.

Quantum cryptography offers indeed the possibility of distributing cryptographic keys between two or more users, by exploiting the laws of quantum mechanics. These keys allow secure communication of data in real time by using encryption algorithms.

Different protocols exist, which can be two-dimensional or multidimensional (in this case, multidimensional means more than 2 dimensions), depending on the number of quantum states used to encode and transmit the key bits. Although two-dimensional states are "easy" to realize, multidimensional states offer multiple properties that can be exploited to improve the efficiency of real systems. For example, in a multidimensional state, the number of classic bits (bits that will form the final key) is directly proportional to the dimensionality of the state used. In addition, these states have a greater robustness to noise and therefore allow the creation of cryptographic keys even in non-ideal scenarios, where standard protocols cannot operate. One of the main reasons for the rare use of multi-dimensional states is the difficulty in generating and manipulating multidimensional states at very high speed.

Quantum states can be created using different degrees of freedom, for example time, space, frequency and others or a combination of them. One of the most effective and suitable system for today's telecommunication networks is time encoding. In time encoding, different time-slots are defined and the different quantum states can be distinguished according to the time of arrival of the photon (or the weak coherent pulse). The basis of quantum states associated to the encoded key bits is called computational basis.

In addition to the computational basis, it is also necessary to prepare a second basis of quantum states, the so-called superposition basis, in order to certify the security of the quantum protocol.

Although, as said, quantum cryptography is intrinsically rather secure, there is still the possibility of attacks due to technical limitations of real systems. Assuming that there is a quantum channel between Alice and Bob (two users) and Alice is sending a cryptographic key via the quantum channel, the quantum information which is transferred via the channel may be tampered with. As an example, in the original BB84 protocol of quantum key distribution, Alice sends quantum states to Bob by preparing single photons. In practice, many practical implementations use instead laser pulses, attenuated to a very low power level, to prepare the quantum states. These laser pulses contain a very small number of photons, for example with an average value of 0.2 photons per pulse, which are distributed according to a Poissonian distribution. This means that most pulses actually contain no photons (no pulse is sent), some pulses contain 1 photon (which is the desired value) and a few pulses contain 2 or more photons. If the pulse contains more than one photon, then an eavesdropper (Eve) can split off the extra photons and transmit the remaining single photon to Bob. This is the essence of the photon number splitting attack, where Eve (eavesdropper) stores these extra photons in a quantum memory until Bob detects the remaining single photon and Alice reveals the encoding basis. Eve can then measure her photons in the correct basis and obtain full information on the key bits transported by multiphoton pulses, without introducing any detectable errors.

Examples of prior art documents are:

Vagniluca I et al.: "Efficient time-bin encoding for practical high-dimensional quantum key distribution", Phys. rev. applied 14, 014051 (2020), Beatrice Da Lio et al.: "Stable transmission of high-dimensional quantum states over a 2 km multicore fiber", IEEE journal of selected topics in quantum electronics, Vol. 26, no. 4, July/August 2020, and "Quantum key distribution (QKD); Component characterization: characterizing optical components for QKD systems", Group specification, ETSI, 650 Route des Lucioles, F-06921 Sophia Antipolis Cedex—France, Vol. ETSI GS QKD 011 v1.1.1 (2016 May).

There is therefore the need for a quantum transmitter which is capable of transmitting a cryptographic key in a N-dimensional quantum state in an easy manner. Furthermore, there is a need to transmit the cryptographic key in a secure manner. Furthermore, there is a need of sending a quantum key to a receiver via a plurality of different quantum channels.

SUMMARY

In a first aspect, the present invention relates to a quantum key distribution transmitter for sending a quantum key via a quantum channel using an N-dimensional protocol, where the N dimensional protocol includes a p-dimensional time-bin protocol, the transmitter comprising:

A pulsed laser configured to emit a train of laser pulses, each pulse having a random phase with respect to the phase of the following pulse in the train, the pulsed laser being a gain-switched pulsed laser or a direct modulated laser;

a first intensity modulator configured to divide a pulse of the train of pulses in a group of p consecutive sub-pulses identical to each other;

a variable optical attenuator configured to reduce the intensity of each sub-pulse of the group of p consecutive sub-pulses;

a beam splitter comprising a first arm and a second arm, the beam splitter being configured to receive the group of p sub-pulses and split the group of p sub-pulses in a first and second split groups of p sub-pulses, identical to each other in the first and second arms;

wherein the first arm comprises a second intensity modulator and a first phase modulator configured to modify the intensity and/or phase of the sub-pulses of the first split group, and the second arm comprises a third intensity modulator and a second phase modulator configured to modify the intensity and/or phase of the sub-pulses of the second split group, to generate in at least one of the first arm and second arm quantum states according to the p-dimensional time-bin protocol.

In particular, the beam splitter and the feature related to "the first arm comprises a second intensity modulator and a first phase modulator configured to modify the intensity and/or phase of the sub-pulses of the first split group, and the second arm comprises a third intensity modulator and a second phase modulator configured to modify the intensity and/or phase of the sub-pulses of the second split group, to generate in at least one of the first arm and second arm quantum states according to the p-dimensional time-bin protocol" allow to obtain the technical effect of preparing all the quantum states needed for the quantum key distribution protocol. This configuration brings the advantage of the reconfigurability of the transmitter by using only few optical devices (i.e., intensity and phase modulators). Another advantage of this scheme is the possibility of using a two-level system for the electronic signal, which is usually very difficult to generate for high repetition rate frequencies.

It should be noted that the cited document "Beatrice Da Lio et al" deals with a counter-propagation laser emitting at the same wavelength of a quantum signal (or quantum channel), the counter-propagation laser being injected into a multi-core fiber in order to stabilize an optical channel. This solution is the opposite of the transmitter according to the first aspect of the invention since this paper is not scalable neither in the distance and in the number of cores of the multicore fiber. In particular, the solution reported in the literature allows only the preparation of one specific quantum state and is not able to meet the criteria for a QKD transmitter, i.e., the capacity to prepare all the different quantum states necessary for the protocol. In addition, the solution disclosed by the cited document "Beatrice Da Lio et al" does not allow the scalability in terms of distance since the speed of light is limited and the feedback loop cannot control the fluctuations in real-time. In other words, in the case of counter-propagated laser the maximum distance depends on the speed of the fiber fluctuations and this is not true in the claimed invention.

In a second aspect, the invention relates to a method to transmit a cryptographic key via a quantum channel using a N-dimensional protocol, wherein the N dimensional protocol includes a p-dimensional time-bin protocol, the method comprising:

selecting the dimensionality p of the time-bin protocol;

emitting a train of laser pulses, each pulse having a random phase with respect to the phase of the following pulse in the train;

dividing a pulse of the train of pulses in p consecutive sub-pulses identical to each other forming a group of p sub-pulses;

lowering the amplitude of each sub-pulse of the group;

splitting the group of p sub-pulses in first and second split groups of p sub-pulses identical to each other, travelling in two identical optical paths;

modulating the intensity and/or the phase of at least one of the first or second split group of p sub-pulses, to generate quantum states according to the p-dimensional time-bin protocol.

Quantum communications systems exploit the possibility of transmitting information encoded in quantum states over an optical fiber link. Quantum states are prepared in such a way that an eavesdropper unavoidably introduces a disturbance in the quantum states transmitted between two interlocutors. Such a disturbance reveals the eavesdropper's activity to the two legitimate partners.

A transmitter is used to send through a quantum channel a cryptographic key. The quantum channel can be for example a physical channel, such as an optical fiber, or a wireless channel. The information shared using the quantum channel is preferably only the quantum key, which is further used to encrypt all the information to be shared between the two parties. The information encrypted using the quantum key is then shared through a "classical channel". The quantum channel and the classical channel may be in some embodiment the same channel, such as an optical fiber.

In the following the terms "downstream" and "upstream" refer to the direction of propagation of the signals in the transmitter.

A further channel may be present, called service channel. The service channel may be an auxiliary optical channel useful for the synchronization and stabilization between the transmitter and the receiver of the quantum communication system. For example, the service channel may be a bidirectional full-duplex optical link.

The quantum key shared through the quantum channel and generated by the transmitter is in form of a plurality of single photons (ore weak coherent pulses), each prepared in a specific quantum state. The different quantum states used in order to transmit the information are defined according to a quantum cryptography protocol.

Thus, the plurality of single photons emitted by the transmitter form a quantum key. Each single photon (weak coherent state) is prepared in a quantum state, and the set of different quantum states belong to an N-dimensional Hilbert space. When N=2, the single photons are called "qubits". In order to define the quantum states, a single degree of freedom, or more than one, different, degrees of freedom of the photon could be used. For example, the polarization, the phase, the frequency, etc. could be used. In order to have an N-dimensional protocol, more than one degree of freedom may be combined. For example, a N dimensional protocol could be defined by the combination of a first degree of freedom having dimensionality p and a second degree of freedom having dimensionality q, where p+q=N.

In this invention, preferably, the time of arrival (time-bin) is used as degree of freedom. The time-bin encoding may be used alone. If the time-bin has a p-dimensional basis, then in this example p=N. Alternatively, the time-bin and another degree of freedom may be used. As the additional degree of freedom, one of polarization and path may be used. Therefore, the time-bin may be combined with polarization or path to generate together an N-dimensional quantum transmitter. In this case N=p+q, where p is the dimensionality of the p-dimensional time-bin basis and q is the dimensionality of the path/polarization basis, where $p \geq 2$ and $q \geq 2$. Preferably, when more than one degree of freedom is used, q=2, and p is arbitrary. Preferably, therefore, the dimensionality of the time-bin protocol can be arbitrary, while polarization degree of freedom is preferably limited to an encoding dimensionality equal to two. If only the time-bin encoding is used, the dimensionality p=N is also arbitrary.

Furthermore, also three degrees of freedom may be used, so that a combination of time bin, path and polarization is obtained.

Thus, in the method of the invention, a time-bin protocol is selected, with a quantum basis determining the number of its dimensionality p.

The transmitter of the invention comprises a pulsed laser, the pulsed laser being a gain switch pulsed laser or a direct modulated laser. The pulsed laser is configured to generate optical pulses.

Preferably, the pulsed laser is a direct modulated laser.

The direct modulated laser is a known technique in optics by which a laser is directly controlled with an arbitrary electronic waveform, and the optical power of the laser is in agreement with the electronical signal connected to the laser.

The quantum key distribution (QKD) transmitter advantageously uses a gain switched laser, which has been shown to generate spectrally uncorrelated optical pulses, i.e., optical pulses having independent and randomly distributed phases. An eavesdropper intercepting and measuring one optical pulse therefore cannot infer anything about any other optical pulse transmitted by the QKD transmitter. The QKD transmitter is preferably a linear scheme, which advantageously does not require additional pump lasers or control loops.

The gain-switched mode is a known technique in optics by which a laser can be made to produce pulses of light of extremely short duration (in general order of picosecond). The term gain-switching mode derives from the negative gain when carrier density (or pump intensity in the active region of the device) is below the threshold, and it switched to a positive value when carrier density or the pump intensity exceeds the lasing threshold (see Appl. Phys. Lett. 52, 257 (1988)). This technique may limit the overall performance of the laser since the maximum repetition rate is defined by the inverse of the pump power.

On the contrary, the direct modulated laser allows the repetition rate of the source to be defined by the bandwidth of the laser and of the driver, thereby increasing the overall efficiency and performance of the quantum transmitter.

The pulsed laser is adapted to emit a train of pulses. All pulses of the train have preferably the same characteristics. Preferably, all pulses in the train have the same amplitude. Preferably, all pulses in the train have the same duration (also called width of the pulse).

The transmitter includes a first intensity modulator. When the pulse has been produced by the pulsed laser, it is "carved" in p sub-pulses, where p is equal to the dimensionality of the time-bin protocol. That is, the initial pulse generated by the pulsed laser, is divided into p sub-pulses. If a 2-dimensional time-bin protocol is selected (that is, if p=2), then the pulse is divided in two sub-pulses, a "later" and an "earlier" sub-pulse according to the time-bin protocol. This division is performed by the first intensity modulator. The p sub-pulses, being all carved from the same starting laser pulse, have the same phase and form a "group" of p sub-pulses.

The original train of pulses is thus transformed by the first intensity modulator into a train of groups of sub-pulses, each group having p sub-pulses.

The p sub-pulses in a group are preferably identical to each other, all having the same amplitude and phase. Preferably, all sub-pulses in a group have also the same duration.

Furthermore, the (time) distance among the p sub-pulses in a single group is preferably the same.

Preferably, the sub-pulses of all groups have the same amplitude and the same duration. However, the sub-pulses of each group have a different phase with respect to the sub-pulses of another group, the phase difference being random. Sub-pulses belonging to different groups have been generated from different pulses and thus have random respective phases.

In an embodiment, the quantum states emitted by the transmitter comprise the signal states and at least one set of decoy states. As detailed below, the responsible element of the decoy states is the first intensity modulator. Thus, downstream of the first intensity modulator, "downstream" with respect to the direction of propagation of the pulses, trains of groups made of p sub-impulses travel in a given direction. Preferably, each group of sub-pulses contains sub-pulses having all the same amplitude. This amplitude is either a "high" amplitude for the "signal state", or it is a lower amplitude for the "decoy state".

In an embodiment, the quantum transmitter is configured to prepare many sets of decoy states, each set with a fixed amplitude, according to the quantum communication protocol. Decoy states may thus be generated by the same transmitter in the same way as signal states, by simply setting the required amplitude to be applied by the first intensity modulator.

Preferably, the transmitter comprises a control unit that drives the first intensity modulator. For example, the control unit may send a signal having a specific pattern to the first intensity modulator when a decoy signal is to be generated.

Further, the transmitter includes a variable optical attenuator, receiving as an input the groups of p sub-pulses generated by the first intensity modulator. When the p sub-pulses are obtained, the variable optical attenuator (VOA) is used to decrease the amplitude of the sub-pulses, compared to the amplitude of the sub-pulses before the attenuator. The goal is to achieve the "quantum level" at the output of the transmitter. Thus, the "one photon" pulses is desired to obtain the single-photon quantum states. The sub-pulses exiting the first intensity modulator usually comprise, on average, more than one photon. Of course obtaining "one photon pulses" exactly for all pulses is substantially impossible and therefore the optical attenuator is configured to attenuate the optical sub-pulses in order to approximate a single photon source. The optical attenuator is preferably configured to attenuate the optical pulses to such a level that the photon number of the pulses follows a Poissonian distribution with a mean value of less than 1. To be noted that the quantum level has to be obtained at the end of the transmitter (i.e., at the input of the quantum channel). In other words, the sub-pulses exiting the optical attenuator are not exactly at the level of a single photon because the losses of the different optical components cascaded in the transmitter have to be taken into account. The optical attenuator reduces the number of photons in a sub-pulse to a number which "reasonably" later results in a quantum regime at the output of the transmitter.

As output of the optical attenuator, a train of attenuated groups of p sub-pulses is obtained. The attenuated groups of sub-pulses are identical to the train of group of p sub-pulses when it comes to number of sub-pulses per group, phase of the sub-pulses, and duration and time-distance of each sub-pulse. On the other hand, each sub-pulse of the attenuated group changes its amplitude. The amplitude of each sub-pulse of an attenuated group at the exit of the VOA is lower than the amplitude of the corresponding sub-pulse of the group at the entry to the VOA. Thus, at the exit of the variable attenuator, a train of attenuated groups of sub-pulses is present, having a lower amplitude than the train of groups of sub-pulses received as input. Preferably, the amplitude of all sub-pulses in the same attenuated group is the same.

Downstream the VOA, preferably, all sub-pulses in the same attenuated group have the same duration. Furthermore, the distance among the p sub-pulses in the same attenuated group is preferably the same. Downstream the VOA, preferably, all sub-pulses in the same attenuated group have the same amplitude. In other words, preferably the action of the VOA is the same for all sub-pulses in the same group. Preferably, the action of the VOA is the same for all groups reaching the VOA.

The transmitter comprises a beam splitter having as input the attenuated group of p sub-pulses and having two identical outputs. The attenuated groups of sub-pulses exiting the VOA are directed towards the beam splitter. The beam splitter includes a first and a second arm. In each of the arm, an intensity modulator is present, therefore in the first arm a second intensity modulator is present and in the second arm a third intensity modulator is present. Furthermore, in each arm, a phase modulator is also present. Therefore, in the first arm, a first phase modulator is present and in the second arm a second intensity modulator is present. The phase modulators are located downstream the intensity modulators. However, the phase modulators may be located also upstream the intensity modulator, as long as in each arm a sequence of intensity modulator—phase modulator (in any order) is present. In each arm, the intensity modulator and phase modulator modify the amplitude and the phase of the sub-pulses travelling in the arm, and it is not relevant in which order the two variables (amplitude and phase) are modified.

The beam splitter divides each incoming attenuated group of p sub-pulses into two identical split groups of p sub-pulses. After the split, in the first and second arms of the beam splitter, the quantum states according to the desired protocol are formed, by acting on the intensity and phase modulators.

In other words, downstream the VOA, the attenuated groups of p sub-pulses are split in two identical split groups of sub-pulses which travel along identical but separated path, a first and a second path. The first and second path corresponds to the first and second arm. At this stage, before the split group enters the phase or intensity modulator, the group includes p sub-pulses all identical to each other.

While in the first and second arms of the beam splitter the intensity modulator are always used in order to generate the quantum states (according to the desired protocol), the phase modulator may be used or not depending on the protocol.

The beam splitter and the second and third intensity modulator, and possibly also the first and second phase modulator, are used to generate the quantum states according to the selected p-dimensional time-bin protocol. In other words, the second and third intensity modulators change the amplitude of the sub-pulses in a group according to the quantum state in the p-dimensional time-bin protocol in which the group of p sub-pulses is to be transformed.

The second and third intensity modulator are driven by the control unit, which sends an electric signal to the second or third intensity modulator. The signal identifies which quantum state is desired and thus which action the intensity modulator should have on the split group.

Preferably, the second and third intensity modulators act on each sub-pulse of a split group either leaving its amplitude unchanged or bringing its amplitude equal to zero. The second and third intensity modulators thus either let the sub-pulse pass, or they suppress it. The intensity modulator creates the "early" or "late" state depending on the signal that they receive from the control unit, if a two-dimensional time-bin protocol is used.

The first and second arm of the beam splitter are identical to each other. Thus, the split group of sub-pulses reaching the second intensity modulator is identical to the split group of sub-pulses reaching the third intensity modulator at each instant. Each split group, before entering the respective intensity modulator, contains p sub-pulses having all the same amplitude and phase. Each split group, before entering the respective intensity modulator, can be substantially considered as a quantum state according to the selected time-bin protocol, and in particular, it can be considered as a superposition of photons in all bins (which correspond to a state in the superposition basis, also called X basis). Thus, if the second intensity modulator alters the amplitude of all the sub-pulses of the incoming split group and it outputs them with a resulting amplitude equal to 50% the original amplitude. The output of the second intensity modulator is already a quantum state in the X basis (superposition state). In the same way, if the third amplitude modulator changes the amplitude of the sub-pulses of the incoming split group and it outputs them with a 50% of the original amplitude, the output of the third intensity modulator is already a quantum state in the X basis (superposition state). If the second and/or third intensity modulators modify the amplitude of one or more sub-pulses in the group, but not all, the modification is either leaving the amplitude of some of the sub-pulses unchanged and lowering the amplitude to zero (no photon in that time bin) for other sub-pulses, or bringing the amplitude equal to zero for all sub-pulses in the group. In this way, all quantum states belonging to the p-dimensional time-bin protocol can be realized in the "time-of-arrival" basis, usually called Z basis. For example, in a two-dimensional time-bin encoding, each intensity modulator can create a "late"-bin state or an "early"-bin state bringing the amplitude to zero of the pulse in the undesired bin.

Otherwise, if a state of the superposition basis is to be created (X basis), then the intensity modulator, either the second or the third, does not act on the group because a state of superposition is already present.

Furthermore, for some quantum states, the sub-pulses in the same group should have a phase difference. However, all sub-pulses in the same group have the same phase, being carved from a single original pulse. The phase modulator is thus used to create those quantum states in which the phase of the sub-pulses in the same group is not the same.

In this way, after the intensity and phase modulators, in each arm a first and a second train of quantum states is present, each train in a different arm. The first and second train may be different from each other, depending on how the intensity and phase modulator of each arm are driven. Thus, a first set of quantum states may exit the first arm and a second set of quantum states may exit the second arm.

The first and/or the second trains may be used as such as the desired quantum key, or a further elaboration may be performed.

The proposed transmitter of the present invention allows a great flexibility in its use. The transmitter is adapted to generate a quantum key using at least one degree of freedom in any dimension. The transmitter always uses a time-bin encoding, in an arbitrary dimension p. The transmitter can easily adapt to generate a p-dimensional key in a time bin protocol and—in case the value of p changes—very few changes are required in the transmitter. Further, few changes are required in order to send a quantum key using two different degrees of freedom. The transmitter further may send a quantum key through many different types of quantum channel. Possible quantum channels to be used with the transmitter of the invention are for example single mode optical fibers, multimode optical fibers, multicore optical fibers, underwater channel and free-space communication. Furthermore, underwater quantum channels and free space links can be used as well. This flexibility is obtained simply by adding to this basic structure few additional "blocks", if needed.

As an example, the "basic block" of the transmitter above described is already enough to send a quantum key using a time-bin p-dimensional protocol through a single-mode fiber. In this case, one of the two arms of the beam splitter is connected to the single mode fiber to transmit the quantum states. The other of the two arms has in this configuration no use.

The "basic block" of the transmitter above described is also enough to send a quantum key using a time-bin p dimensional protocol through a multi-core or a multi-mode fiber. In this case, the N-dimensional encoding also uses an additional degree of freedom, which is the path. The first arm is connected to a first mode/core of the multi-mode/core fiber and the second arm is connected to a second mode/core of the multi-mode/core fiber. A quantum key in time and path is thus distributed.

Furthermore, the "basic block" above is enough to send a quantum key using two degrees of freedom, time and polarization, using the quantum states generated in both the first and second arm and connecting the first and second arm to a beam combiner connected to a single-mode optical fiber.

Preferably, the transmitter comprises a beam combiner and the first arm and the second arm include a first polarizer and a second polarizer to polarize the first and second split groups of sub-pulses, respectively, according to a first and a second polarization axis, the first and second polarization axis being orthogonal, the first and second arm being connected to the beam combiner which combines the first and second split groups, polarized along the first and second axis respectively, into a single signal comprising quantum states in a time-bin basis and in a polarization basis.

The technical effect obtained by this feature is the combination of a time-bin protocol into a polarization-based one. This technical feature allows the generation of a multi-protocols QKD transmitter. This advantage can be exploited for QKD systems in free-space or underwater since polarization is a reliable degree of freedom and it is usually not perturbated neither by the atmosphere or the scattering water.

Therefore, in this case the beam splitter may be a polarizer beam splitter.

Preferably, the beam combiner is configured to combine the first arm and the second arm into a single-mode fiber.

It should be noted that the cited document "Vagniluca I et al." discloses a polarizer beam splitter which is positioned just in front of a receiver side for filtering out some extra polarization noise which might be measured in the fiber channel rather than describes a polarizer beam inserted in a transmitter. Therefore, a transmitter comprising a beam combiner and a beam splitter having the first arm and the second arm which include a first polarizer and a second polarizer to polarize the first and second split groups of sub-pulses, respectively, is not disclosed by the document "Vagniluca I et al.".

Preferably, the method of the invention comprises connecting the first and/or the second path to a single-mode optical fiber so that the quantum states can travel in the single mode optical fibers.

Preferably, the method of the invention comprises polarizing the first split group along a first polarization axis and the second split group along a second polarization axis, the first and the second polarization axis being orthogonal to each other.

combining the first split group polarized along the first axis and the second split group polarized along the second axis in a single signal to form quantum states with time-bin and polarization encoding.

Preferably, the transmitter may emit a quantum key according to an encoding in two different degrees of freedom. In addition to the time-bin protocol, therefore, a polarization encoding may be used. For this purpose, the split groups travelling in the first and second arm of the beam splitter are polarized, for example by means of polarizers. The polarizers may be located in any point in the first arm and in the second arm (one polarizer per arm). The first split group travelling in the first arm is polarized along a first polarization axis and the second split group travelling in the second arm is polarized along a second polarization axis. The first and second polarization axes are orthogonal to each other. The two signals coming from the first and second arm are then combined in a single signal by the beam combiner. The beam combiner has thus two inputs and one output. The combination signal is formed by quantum states in the time-bin basis (as generated by the first and second arm using the intensity and phase modulators) and polarization basis. This combination signal then preferably travels within a single mode optical fiber.

Preferably, the first intensity modulator is configured to divide a pulse of the train of pulses in a group of p consecutive sub-pulses identical to each other, having a first amplitude value which defines a signal state, and to divide another pulse of the train of pulses in a group of p consecutive sub-pulses identical to each other having a second amplitude value, different from the first one, which defines a decoy state.

Therefore, the first intensity modulator is configured to create groups of p sub-pulses having two different amplitude value. The first value is the amplitude used to generate the quantum states belonging to the quantum key, thus groups having the first amplitude are called "signal states". The second amplitude value, which is different from the first one, is used to generate the decoy states. The decoy states are used to improve the security of the quantum system. The generation of the group of p sub-pulses having the first amplitude or the second amplitude depends preferably on an additional signal that the first intensity modulator receives from the control unit. The control unit commands the first intensity modulator to generate groups having the first amplitude and, randomly, groups having the second amplitude. Preferably, the amplitude of the decoy state, that is, the second amplitude, is lower than the amplitude of the signal state (the first amplitude).

The invention preferably also relates to a kit comprising:
a transmitter according to the first aspect;
a single-mode fiber or underwater quantum channel or free space channel connected to the first arm or the second arm or to the output of the beam combiner.

The transmitter of the invention may be used in combination to single-mode optical fiber. If the encoding is based on time-bin, in any p-dimensions, then the quantum states generated in the first arm or in the second arm may already form the desired quantum key. Thus, either the first arm or the second arm is connected to the single-mode optical fiber. The signal exiting the other of the first arm or the second arm is simply disregarded. Otherwise, if a quantum key using both time-bin and polarization encoding is desired, the first and second arm both include a polarizer. The two polarizers polarize the split groups along a first and a second polarization axis. The polarized split groups are recombined in a single signal by a beam combiner. The beam combiner does not alter the state of polarization if a single polarized split group reaches it (for example only the first split group polarized along the first polarization axis, or only the second split group polarized along the second polarization axis). On the other hand, if two non-zero split groups from the first and second arms reach the beam combiner at the same time, the polarization of the resulting signal is a diagonal polarization (or anti-diagonal polarization depending on the relative phase of the combined pulse) with respect to the two orthogonal first and second polarization axes. A basis in a polarization encoding can thus be formed, as long as the superposition basis.

Preferably, the invention also relates to a kit comprising:
a transmitter according to the first aspect;
a multi-mode or a multi-core optical fiber, wherein the first arm is connected to a first mode or a first core of the multi-mode or multi-core optical fiber and the second arm is connected to a second mode or a second core of the multi-mode or multi-core optical fiber.

The transmitter of the invention can be used in combination to multi-mode or multi-core optical fibers. In these fibers, also another degree of freedom, in addition to the time of arrival, can be used, the path. The quantum key can have a time-bin encoding, as already detailed, and a path encoding. The first arm of the transmitter may be connected to a first core of the multi-core optical fiber and the second arm may be connected to a second core of the multi-core optical fiber. The connection takes place downstream the first and second phase modulators and downstream the second and third intensity modulators. In the same way, the first arm may be connected to a first mode of the multi-mode optical fiber and the second arm may be connected to a second mode of the multi-mode optical fiber. In both cases, the connection takes place downstream the first and second phase modulators and downstream the second and third intensity modulators. The path encoding may have a basis comprising quantum states where the pulse group propagates in a first core (mode) or in a different second core (mode), or a basis comprising quantum states where there is a superposition of pulse groups propagating in the first and second cores (modes).

Preferably, the transmitter comprises a phase stabilizer of the relative phase between the split group travelling in the first core (mode) and the split group travelling in the second core (mode).

Preferably, the first arm comprises a phase modulating loop including the first phase modulator, the first phase modulator in the phase-modulating loop being configured to modulate the phase of the split group travelling in the first arm and not modulating a stabilization signal having a different wavelength than the split group.

The technical effect obtained by this feature is a quantum signal which is modulated according to the desired mutually unbiased bases, and the non-modulation of the stabilization laser, which has to be used for the stabilization of the optical channel.

It should be noted that the cited document "Quantum key distribution (QKD); Component characterization: characterizing optical components for QKD systems" discloses a polarization-based QKD system. A phase-modulation loop is not mentioned either in the text or in the Figures of that document.

Preferably, the method comprises:
providing a stabilization signal having a wavelength different than the wavelength of the pulses of the train;
propagating the stabilization signal through the first and second path;
modulating the phase of the split group and at the same time not modulating the phase of the stabilization signal travelling the same path of the split group.

One of the main issues in using path-encoding schemes is the stability of the relative phase between cores or modes in the optical fiber. In this encoding scheme, the path encoding is realized by creating a long fiber interferometer used for the propagation of the quantum states between the first core and the second core (or first mode and second mode) of the fiber. In other words, the first core and second core (or first mode and second mode) define the two different arms of an interferometer and this is used for path encoding. To compensate for possible phase drifts between the pulses propagating in the two modes/cores, a phase-locked loop is preferably included. This phase-locked loop includes the generation of an additional signal, for example a continuous-wave laser signal, which is injected in the beam splitter of the transmitter (this signal is called stabilization signal). The additional laser signal has a different wavelength than the pulsed signal emitted by the pulsed laser. This additional signal undergoes the phase and intensity modulation of the first and second arms of the beam splitter and enters in the first and second core (or mode) or the multi-core or multi-mode optical fiber. At the receiver (i.e., the station where the quantum key is sent by the transmitter of the invention) this stabilization signal is detected and, with the help of a phase shifter, is used to "lock" the phase of the multi-mode or multi-core fiber. In order to have more details on this technique, the following article can be considered as integral part of this disclosure:

Yu Xu et al, "*Active phase stabilization for the interferometer with* 128 *actively selectable paths*", published in IEEE Transactions on Nuclear Science, Vol. 66, No. 7, July 2019.

However, as mentioned, the stabilization signal also undergoes a phase variation due to the action of the first and second phase modulators which are located in the first and second arms. The phase modulation of the stabilization signal is not desired because it does not allow a correct locking of the phase of the cores (modes). To avoid this unwanted modulation, the present invention comprises a phase-modulation loop. The phase-modulation loop comprises the first phase modulator of the first arm of the transmitter.

In this phase-modulation loop, two signals having two different wavelengths are present. The first signal is the quantum signal, that is the modulated split groups generating the quantum states travelling in the quantum channel. The second signal is the service signal coming from the second laser for the service channel. These two signals are polarized along orthogonal polarization axes (by using polarization controllers) and then they are made to counter-propagate inside the loop. The phase modulator includes a phase modulation crystal. If the quantum signal is correctly aligned with the phase modulation crystal, it is phase-modulated as desired to form the required quantum state. On the contrary, the stabilization signal is not modulated by the phase modulator since it is counter-propagated in the loop and the signal is orthogonally polarized to the crystal.

The signals are indeed polarized because preferably the laser that generates the pulses generates a polarized train of laser pulses.

BRIEF DESCRIPTION OF THE DRAWINGS

The invention will be better detailed with non-limiting reference to the following figures.

FIGS. 2-7 show different quantum bases of states which can be used for encoding the signal emitted by the transmitter of the invention;

FIGS. 8-10 show different phases of the method of the invention;

DETAILED DESCRIPTION OF THE PREFERRED EMBODIMENTS

Figures 1, 11:
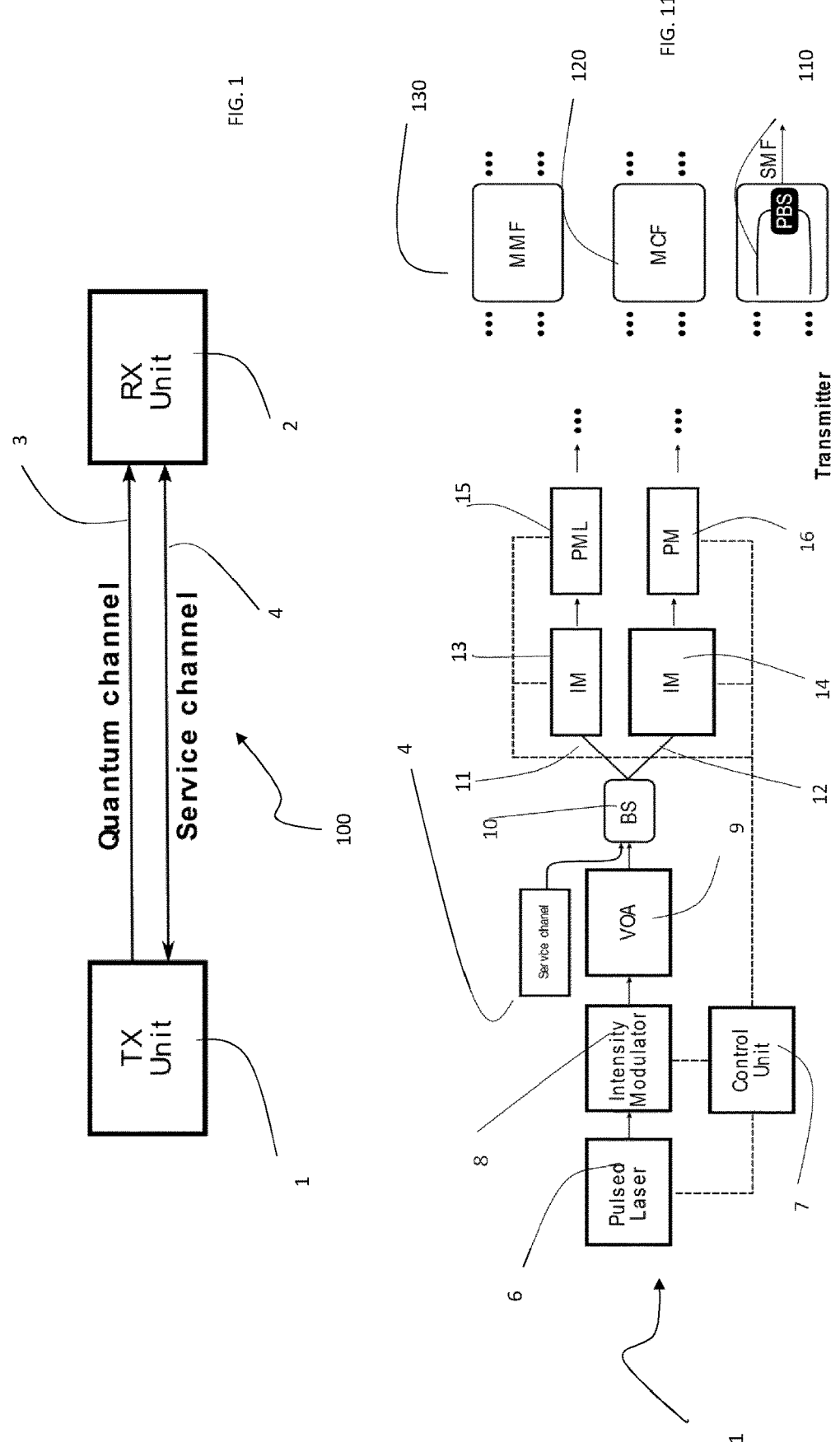
FIG. 1 is a schematic view of a quantum communication system according to the invention.
FIG. 11 shows a detailed view of the transmitter according to the invention.

In FIG. 1, a quantum communication system is schematically depicted and globally indicated with reference number 100.

The quantum communication system 100 comprises a quantum transmitter 1 and a quantum receiver 2. The transmitter 1 and the receiver 2 are connected via a first and a second communication channels 3, 4. The first communication channel 3 is also called a quantum channel and the second communication channel 4 is also called service channel. The quantum channel 3 is used to transmit signals at the single-photon level, while the service channel 4 is used for synchronization, post-processing, and key management. These channels can be integrated within the same optical fiber using two different wavelengths. Alternatively, two different optical fibers, one per channel, could be used. A further channel for the exchange of the information between the transmitter 1 and receiver 2 encrypted using the quantum key transmitted via the quantum channel 3 may be present as well, but it is not depicted in the drawings. Preferably, the additional channel is known in the art and it is not further described herein.

The transmitter 1 is configured to emit a plurality of mutually unbiased basis of quantum states. In particular, the transmitter 1 is capable of generating quantum states with different dimensionality of the Hilbert space. This dimensionality is in the following called N. The bigger the dimensionality, the highest the photon information efficiency (number of bits transported per quantum state ~$\log_2$ (N)).

The dimensionality of the quantum states depends on the number of degrees of freedom considered and the dimensionality selected for the basis of each degree of freedom among those selected.

In the invention, a degree of freedom is the time of arrival, thus a time-bin protocol is used. The dimension of the basis of the time-bin protocol is p, where p≤N.

For example, several bases of quantum states which can be generated by the transmitter of the invention are shown in FIGS. 2-7. In the following, N is the dimension of the quantum states, and when two different degrees of freedom are used, their dimensionalities are called p and q. p is the dimensionality of the time-bin protocol.

Figures 2, 3, 4:
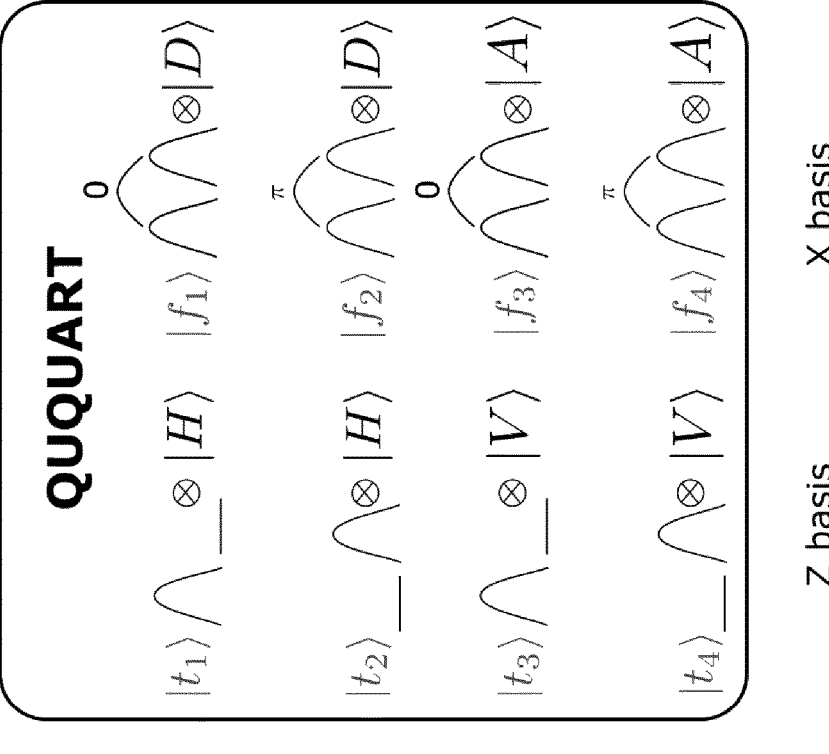

In FIGS. 2 and 3, the standard N=2 BB84 protocol with time-bin encoding with 4 and 3 states is shown. Quantum states belonging to the Z basis, adopted for key bit encoding and X basis, implemented for security checking, are depicted. In each state of the Z basis, only one of the two time-bins (early and late bin) is occupied by a photon, while the third state (X basis) is the linear superposition of the Z basis states, with null relative phase. In the BB84 basis of FIG. 3, the fourth state is the linear superposition of the Z basis states, with n relative phase. The relative phase between the photons in two consecutive bins is altered as a result of any attack that is addressed to the quantum states, during the trip along the quantum channel. The basis of FIGS. 2 and 3 are generated using a single degree of freedom, the time of arrival. The dimensionality of the single degree of freedom is p, which is in this case equal to the dimensionality of the Hilbert space, being the only degree of freedom used (p=N).

FIG. 4 and FIG. 6 show two couples of bases where N=4. Each basis of FIG. 4 uses two degrees of freedom, each degree of freedom being associated to 2 orthogonal states (in each basis). In this case, therefore, the overall dimensionality is given by the sum of the dimensionalities of the two degrees of freedom, that is, N=p+q. In one basis (Z basis), the first degree of freedom is the time of arrival in the standard computation basis, with the early and late states. The second degree of freedom is the polarization and the two orthogonal states in the Z basis are the horizontally (H) and vertically (V) polarized states. The X basis comprises, in the time-bin encoding, the superposition states having a null relative phase or a relative phase equal to n. The superposition states in the polarization encoding are the diagonal (D) and anti-diagonal states (A). The basis of FIG. 6 uses a single degree of freedom, time of arrival, and the dimensionality is still N=4. In this case p=N, being p the dimensionality of the only degree of freedom used. The basis of FIG. 6 is a generalization of the basis of FIG. 2, where now four different time bins are present, and the Z basis includes states with a photon only in one of the four bin. The superposition states (X basis) involve the superposition of photons in all bins.

As shown, to further increase the dimensionality of encoding, more than one degree of freedom can be added. For example, two degrees of freedom can be combined, in this preferred example time-bin and polarization. More specifically in the QUQUART (N=4) and QUEIGHT (N=8) case of FIGS. 4 and 5, the two-dimensional (p=2) and four-dimensional (p=4) time-bin bases have been combined with two-dimensional polarization bases (q=2), generating a global dimension of N=p+q=4 and N=p+q=8, respectively.

To be noted, the same dimensionality N, for example a N=4 QUQUART quantum states, can be created by using only the time-bin degree of freedom (having dimensionality p, and thus p=N), as depicted in FIG. 6, or by using two degrees of freedom, as in FIG. 4 (so N=p+q). The transmitter thus allows a reconfigurability, which is quite useful in the different quantum channel, i.e. optical fiber, free-space and underwater links, based on different environmental conditions.

FIG. 7 shows a couple of QUQUART (N=4) bases formed using two degrees of freedom. The first degree of freedom is the time of arrival and the second is the path. For these bases, a quantum channel 3 having at least two different paths, called path A and path B, is needed. The first degree of freedom, time of arrival, is related to the same Z basis as in FIG. 2, while the path has a Z basis that is the superposition (in addition or subtraction) of the quantum states travelling in both path A and path B. The X basis of the path degree of freedom includes states where the quantum state travels either along path A or along path B.

In FIG. 11, a more detailed view of the quantum transmitter 1 of FIG. 1 is shown. The transmitter 1 is preferably used for multicore 120, multimode 130 and single-mode fiber 110 as quantum channel 3, as better detailed below. The various types of fibers that can be connected to transmitter 1 are schematically depicted as separated "rectangles" in FIG. 11. The meaning of this layout is to point out that a selection among those fibers is possible, and the transmission of a quantum key over different links is feasible by using the same transmitter 1.

The transmitter 1 comprises a pulsed laser 6, which emits laser pulses. In this embodiment, the pulsed laser emits a 500 MHz train of pulses, with 1 ns pulse width (50% duty cycle). The pulsed laser is a laser that operates in gain-switching mode or a direct modulated laser. The pulsed laser is for example a Distributed FeedBack (DFB) laser driven electrically.

The power emitted by the pulsed laser is for example about 0 dBm. The wavelength of the pulsed laser depends on the selected optical fiber. The system 1 for example may work in the 0-band, C-band and L-band. To be noted that each pulse of the train emitted by the pulsed laser 6 presents a random phase which is of fundamental property in the quantum communication protocols. This property helps to derive and construct the security of the protocol against coherent attacks.

Furthermore, the transmitter 1 includes a control unit 7. The control unit 7 is connected to the pulsed laser 6 and drives it to emit the train of pulses. The control unit 7 comprises an electronic board which controls preferably not only the pulsed laser 6 but also all the active components of the transmitter 1. Thus, the control unit controls four high-speed electro-optics modulators (intensity-modulators, phase-modulators) as detailed below and the pulsed laser 6. The control unit generates an internal clock reference (preferably from 1 GHz to 12 GHZ) or receives an external electrical clock in input. The clock "decides" the overall frequency of the transmitter 1.

The transmitter 1 includes, downstream the pulsed laser 6, a first intensity modulator 8. The first intensity modulator 8 is driven by a signal from the control unit 7. The output of the pulsed laser 6 is used as an input of the first intensity modulator 8, preferably an electro-optical modulator. In this embodiment, the first intensity modulator 8 receives as an input from the pulsed laser 6 an optical pulse P (500 MHz repetition rate, 1 ns pulse width) and, thanks to a custom pattern generated by the control unit 7, it carves out a group of p sub-pulses SP, with p being the dimensionality of the time-bin protocol to be used. Therefore, at the beginning of the operation of the transmitter 1, the dimensionality of the time-bin protocol is selected. The dimensionality p could be equal to N if only the degree of freedom of the time of arrival is used. By applying a V-pi voltage to the electro-optical modulator 8 it is possible to generate a specific pattern.

As depicted in FIGS. 8-10, the first intensity modulator 8 modifies the pulses P (or at least some of them) coming from the pulsed laser so that sub-pulses SP are formed. Preferably, all the sub-pulses SP have the same intensity (amplitude). Preferably, the sub-pulses SP all have the same duration. Preferably, within a pulse P, all sub-pulses are equally spaced. For example, as shown in FIG. 8, if the pulse (having a duration of 1 ns) is divided in two sub-pulses, each sub-pulse has a sub-pulse width of 125 picoseconds and the distance between a sub-pulse and the subsequent sub-pulse is 375 picoseconds. This division of the pulse P is related to the creation of a 2-dimensional time-bin encoding.

If 4-dimensional time-bin encoding is of interest, as shown in FIG. 9, the pulse P is divided into 4 sub-pulses SP, the sub-pulse width being of 125 picoseconds each, and the distance between sub-pulses of 250 picoseconds. An 8-dimensional scheme is also possible, by using a fast intensity modulator and generating a superposition of 8 sub-pulses, with a sub-pulse width of 125 picoseconds and the distance between the sub-pulses of 125 picoseconds, as shown in FIG. 10.

The sub-pulses carved out from the same laser pulse P are called a group G of sub-pulses SP. The number of sub-pulses p in a group G is identical to the dimension p of the bases defined in the time-bin degree of freedom.

In order to carve out optical pulses with the first intensity modulator 8, an ultra-precise clock and timing is preferably needed. In particular, the two command signals generated by the control unit 7 for the pulsed laser 6 and for the first intensity modulator 8 need preferably to be properly synchronized. The control unit 7 for example emits a fast on-off pattern, which controls the first intensity modulator 8, and carved out the 2-dimensional superposition. A precision below one picosecond is required for a correct modulation format.

In addition, the first intensity modulator 8 is also used to implement the decoy state technique. Whether a pulse generates a signal group of sub-pulses belonging to a signal or decoy state depends on the command signal received from the control unit 7. By using the custom pattern generated by the control unit, the laser pulse P may be attenuated, thus generating lower intensity sub-pulses in the decoy state technique.

The preparation of the decoy state is random, and decided by the control unit 7. In the transmitter 1, the information on when the decoy state signals have to be prepared is stored. Once the receiver 2 has detected the photons coming from the transmitter 1, the presence and location of decoy states can be disclosed and it can be determined whether a photon-number splitting attack was performed in the communication link by checking the statistics of the photon number.

The transmitter 1 further comprises a variable optical attenuator 9, preferably also controlled by the control unit 7. The output of the first intensity modulator 8 is an input to the variable optical attenuator (VOA) 9 for decreasing the optical power close to the quantum regime. By tuning the output power, it is possible to reach the quantum level. Thus, the output of VOA 9 is a train of attenuated groups of p sub-pulses each, having a lower amplitude than the train of groups of sub-pulses before the VOA. However, the number of p sub-pulses per group, their duration and time spacing remain substantially unaffected by the VOA.

Further, the transmitter 1 includes an optical beam splitter 10, which divides the input beam (the train of attenuated groups of sub-pulses) coming from the variable optical attenuator into two identical signals propagating through two identical paths. The beam splitter 10 is preferably a 50% beam splitter and it includes for this purpose a first arm 11 and a second arm 12. The two arms 11, 12 are identical to each other. Each arm 11, 12 includes an intensity modulator, a second and a third intensity modulator 13, 14 respectively. The second and third intensity modulators 13, 14 are identical to each other. The beam splitter 10 and the intensity modulators create the quantum states according to the p-dimensional time-bin protocol. In particular, by carefully controlling the two intensity modulators 13, 14, it is possible to prepare the superposition basis (or X basis in the time-bin encoding) or the computational basis (or Z basis in the time-bin encoding, e.g. early or late time-bin) in a p dimensional-encoding. Further, each arm 11, 12 comprises a phase modulator, first phase modulator 15 and second phase modulator 16. Indeed, in order to create the superposition basis of some quantum states, also the phase modulators are needed.

The intensity modulator may be for example a Mach Zehnder. If p>2, then a cascade of Mach Zehnders may be needed. For example, a suitable configuration is described in Sinsky, Jeffrey H. "High-speed data and pulse-carver alignment in dual Mach-Zehnder modulator optical transmitters using microwave signal processing." *Journal of lightwave technology* 21.2 (2003): 412-423.

Two identical signals travel in the two arms 11, 12, which are the incoming signal to the beam splitter split in two. Thus, a train of split groups of sub-pulses travels in the first arm 11, and an identical train of split groups of sub-pulses travels in the second arm. The sub-pulses travelling in the first arm 11 and in the second arm 12 have the same width and number per group and distance as the sub-pulses that impinged on the beam splitter 10, however they have a different amplitude. Therefore, the groups of sub-pulses travelling in the first arm 11 and the second arm 12 include each p sub-pulses having the number, duration and spacing as detailed above.

Figure 12:
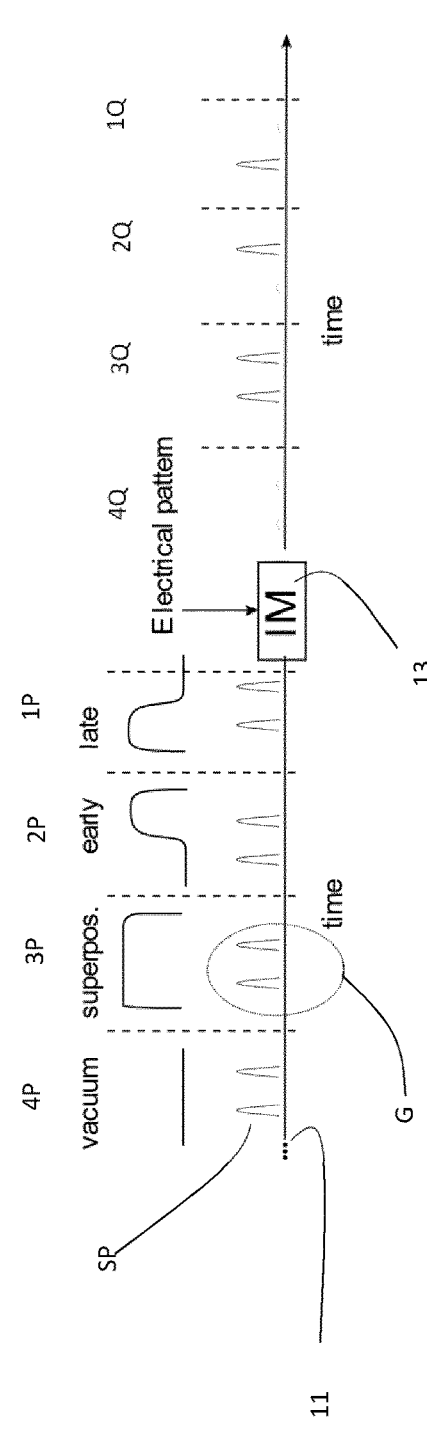
FIG. 12 shows a detail of the transmitter of FIG. 10.

The action of the second or third intensity modulators 13, 14 in each arm 11, 12 is as follow. With reference to FIG. 12, the functioning of the second intensity modulator 13 is depicted. The third intensity modulator 14 works in the same way and it will not be further detailed.

The second intensity modulator 13 receives a command electric signal from the control unit 7. This signal determines in which quantum state the split group G of p sub-pulses SP entering the second intensity modulator 13 has to be transformed. As an example, the basis according to FIG. 3 is the chosen basis. In this basis, p=2. Thus, each pulse P has been transformed by the first intensity modulator 8 and VOA 9 in groups G of 2 sub-pulses SP each.

In FIG. 12, four different groups G enter the second intensity modulator 13, one after the other in time. The groups are named 1P, 2P, 3P, 4P. The group 1P is the first to reach the second intensity modulator, then the second group 2P after a given time interval, and so on. When the first group 1P enters the second intensity modulator, the electric signal from the control unit forces the intensity modulator 13 to transform such a group 1P in the quantum state $|t_1\rangle$ of FIG. 2 or 3, that is, a photon in the "late" bin. As seen at the output of the intensity modulator (right part of FIG. 12 after IM), the result of the application of the second intensity modulator 13 on group 1P is thus quantum state 1Q where only a photon in the late bin is present. When the second group 2P enters the second intensity modulator 13, the electric signal from the control unit forces the intensity modulator 13 to transform such a group 2P in the quantum state $|t_2\rangle$ of FIG. 2 or 3, that is, a photon in the "early" bin. As seen at the output of the second intensity modulator (right part of FIG. 12 after IM), the result of the application of the second intensity modulator on group 2P is thus quantum state 2Q where only a photon in the early bin is present. When the third group 3P enters the second intensity modulator, the electric signal from the control unit forces the second intensity modulator 13 to transform such a group 3P in the quantum state $|f_1\rangle$ of FIG. 2 or 3, that is, a superposition of photons in both bins. As seen at the output of the second intensity modulator (right part of FIG. 12 after IM), the result of the application of the second intensity modulator on group 3P is thus quantum state 3Q where the group 3P has an amplitude which is half of the original amplitude. When it comes to the 4P group, this group is not transformed in a quantum state, but in a decoy signal. The first intensity modulator varies the amplitude of the sub-groups, generating a first type of decoy signal, while the second and third intensity modulator 13, 14 may introduce the "vacuum state", where no photon is emitted. Thus, the outcome of the application of second intensity modulator 13 onto the group 4P is that no photon is exiting, as shown in 4Q.

In case the basis of FIG. 3 is chosen, then in order to form the quantum state $|f_2\rangle$ of FIG. 3, also the first phase modulator 15 comes into play, because the relative phase between the bins has to be changed.

The above applies as well if the basis of FIG. 6 is desired. This basis is obtained in the same way as the p=2 basis of FIG. 2 or 3, generating a group having 4 sub-pulses, instead of 2, by the first intensity modulator 8 and controlling the amplitude in each of the four bins with the second/third intensity modulator 13, 14. In order to generate the X basis, the phase modulators 15, 16 may need to be used.

In this way, quantum states in any p-dimensional time-bin encoding can be obtained in the transmitter 1.

The third intensity modulator 14 and second phase modulator 16 in the second arm 12 may generate the same quantum states as the second intensity modulator 13 and first phase modulator 15 in the first arm 11, or different ones, depending on the application. Examples are given below.

Figures 13A, 13B:
FIG. 13*a* and FIG. 13*b* show a first embodiment of the transmitter of FIG. 11 generating a first and a second quantum state.

In a first example depicted in FIGS. 13a and 13b, the transmitter 1 is combined with a single-mode fiber 110 and only a 2-dimensional time-bin encoding is used (p=N=2). The second arm 12 of the beam splitter 10 is not used for generating the quantum channel. Preferably, only the second intensity modulator 13 combined with the first phase modulator 15 are used for the preparation of the quantum states. The first arm 11 receives the groups G of sub-pulses generated by the first intensity modulator 8 (see in FIG. 12a the schematic signal above the first intensity modulator 8), and then by using a custom pattern, it is possible to decide which quantum state to prepare. Based on the electrical signal generated by the control unit 7 (see second intensity modulator 13 and the signal depicted on top of it in FIG. 13a) and sent to the second intensity modulator 13, one of the quantum states in the computational basis of FIG. 2 or 3 can be prepared. When preparing the Z basis, the phase modulator 15 does not impose an additional phase between the sub-pulses. This is depicted in FIG. 13a where the preparation of state $|t_1\rangle$ is shown, in the same way as depicted above with referenced to FIG. 12, that is, the second intensity modulator 13 received from the control unit 7 an electric signal to suppress the photons in the early bin. To prepare the X basis, the second intensity modulator 13 does not modulate the amplitude of the incoming split groups of sub-pulses and the first phase modulator 15 forces a specific phase to the time-bin. In FIG. 13b, for example, the formation of the quantum state $|f_1\rangle$ is shown. The split group coming from the beam splitter is already a superposition of photons in two bins, having the same phase. In this specific example, the second intensity modulator 13 lowers the amplitude of the sub-pulses to half of the original amplitude. The first phase modulator 15 is not used because the photons in the two time bins have already the same phase and are superimposed, due to the fact that they have been carved from the same pulse.

Figures 14A, 14B:
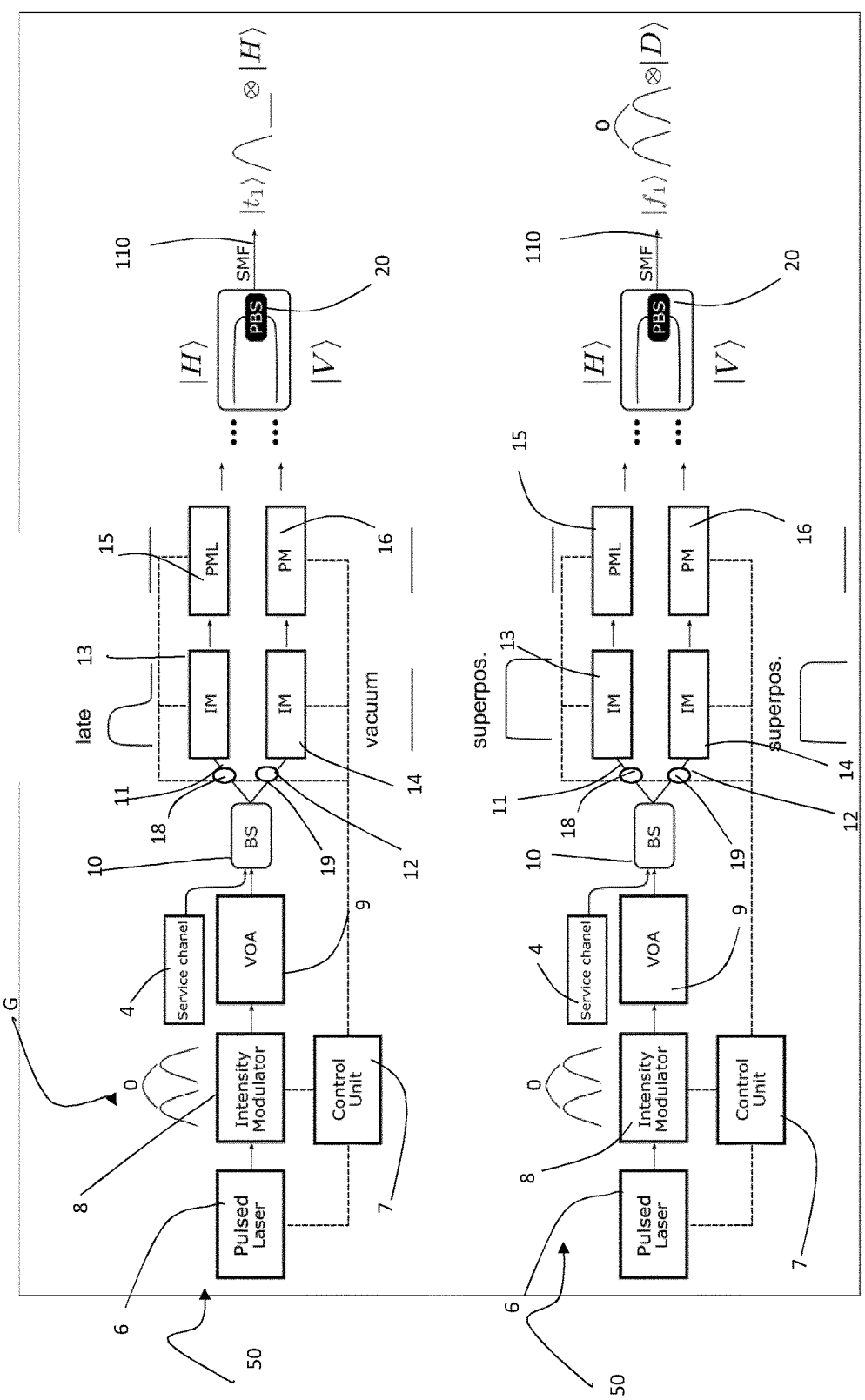
FIG. 14*a* and FIG. 14*b* show a second embodiment of the transmitter of FIG. 11 generating a first and a second quantum state.

If also a second degree of freedom is used, for example the polarization, the transmitter can be adapted to generate a quantum key using both the time-bin degree of freedom and the polarization degree of freedom. This example is depicted in FIGS. 14a and 14b using transmitter 50. Only the differences between the transmitter 50 and the transmitter 1 of the previous example will be detailed below. With the same numerals, the same components that have been detailed with reference to transmitter 1 are indicated also in transmitter 50.

Transmitter 1 is substantially the "basic configuration" of the transmitter of the invention onto which further blocks (for example, elements, optical devices) are added.

Transmitter 50 comprises a first and a second polarizer 18, 19 located in the first and in the second arm, 11, 12, respectively, of the beam splitter 10. The first and second polarizer 18, 19 polarize the train of split groups travelling in the first and second arm 11, 12 along a first and a second polarization axis which are orthogonal to each other. The first and second polarizer may be located before the intensity modulators 13, 14 or after the intensity modulators 13, 14. Furthermore, the first and second polarization controllers 18, 19 may be located before or after the first and second phase modulators 15, 16. In the depicted example, the two orthogonal axes of polarization of the first and second polarization controller are the horizontal axis for the first polarizer 18 in the first arm 11 and the vertical axis for the second polarization controller 19 in the second arm 12.

Further, the transmitter 50 includes a polarizing beam splitter 20 receiving as input the signals from the first and second arm 11, 12 and emitting a single output, for example in a single mode fiber 110. Thus, the polarizing beam splitter 20 is used as a beam combiner and it combines the two signals from the two arms in a single output.

The transmitter 50 works exactly as transmitter 1 with the exception of the added degree of freedom, which is the polarization. With now reference to the basis in FIG. 4 (time-bin/polarization basis), the overall dimensionality of the Hilbert space is N=4 and the dimensionality of the time-bin basis is p=2. Thus, the groups of p sub-pulses are produced as detailed in transmitter 1 and reaches the beam splitter 10. Here, they are divided in two identical trains of split groups, one per arm. The only difference with transmitter 1 is that now the train of sub-pulses which travels in first arm 11 and second arm 12 are polarized and having orthogonal polarizations.

In order to form basis Z, only one of the two arms 11, 12 is used. For example, as in transmitter 1, at the beam splitter 10, a group of 2 sub-pulses is divided in two split groups of 2 sub-pulses each, one travelling in first arm 11 and the other travelling in the second arm 12. If the first and second quantum states of FIG. 4 are desired, $|t_1\rangle$ and $|t_2\rangle$, then the quantum states are prepared by the first arm 11 as follows. When the split group enters the second intensity modulator 13, the electric signal from the control unit 7 forces the second intensity modulator 13 (see the signal above the intensity modulator 13 in FIG. 13a) to transform such a group in the quantum state with a photon in the "late" bin. Because of the presence of the first polarizer 18, this quantum state is also polarized in the horizontal direction, thus it is equal to $|t_1\rangle = \cap\_\otimes|H\rangle$. In the second arm 12, the third intensity modulator 14 suppresses the split group, thus reaching the "vacuum state". Combining therefore quantum state $|t_1\rangle$ with vacuum at the beam combiner 20 still leads to state $|t_1\rangle$. This is shown in FIG. 13a. The same applies for the formation of $|t_2\rangle$, the only difference being that the intensity modulator 13, receiving the group at the input, transforms the same in a quantum state with a photon in the "early" bin.

When it comes to the third and fourth quantum states of FIG. 4, $|t_3\rangle$ and $|t_4\rangle$, then the quantum states are prepared by the second arm 12, in the same way as described above with reference to the first arm 11 preparing the states $|t_1\rangle$ and $|t_2\rangle$. However, in this case, the second polarizer 19 polarizes the states along the vertical axis, and thus the quantum states emitted by the second arm 12 are vertically polarized. The first arm 11 suppresses all the incoming groups creating a vacuum state. The first arm generates no signal and thus the combination of quantum state $|t_3\rangle$ or $|t_4\rangle$ with vacuum at the beam combiner 20 still leads to state $|t_3\rangle$ or $|t_4\rangle$.

The signals according to the Z basis of FIG. 4 are then inserted in a single mode optical fiber 110.

For the X basis of FIG. 4, both arms 11, 12 create quantum states which are then combined by the polarizing beam splitter 20. For all states $|f_1\rangle - |f_4\rangle$, the second and third intensity modulators 13, 14 reduce the amplitude of the sub-pulses travelling in the respective arm to half of the original amplitude. Further, depending on whether a split group is travelling in the first or second arm, it is polarized horizontally or vertically.

Depending on the quantum state of the basis to generate, the first or second phase modulator 15, 16 may modify the incoming group. For example, as depicted in FIG. 13b, if the state $|f_1\rangle$ of FIG. 4 is desired, the intensity modulators 13, 14 modulators reduce the amplitude of the sub-pulses travelling in the respective arm to half of the original amplitude. Thus in the first arm 11 there is a group which is a superposition in two time bins and polarized horizontally. In the second arm 12, there is a group which is a superposition in two time bins and polarized vertically. When the two groups from the first arm and from the second arm combine in the polarizing beam splitter 20, then a superimposed state polarized diagonally is formed, that is $|f_1\rangle = \cap\cap\otimes|D\rangle$. In order to form the state polarized along the anti-diagonal, then the first phase modulator 15 forces a global phase equal to n to the group of two sub-pulses in the first arm 11.

In this example, therefore, time and polarization degrees of freedom are used to generate high-dimensional quantum state in a single-mode fiber 110. The polarization beam splitter 20 is used to combine the groups propagating in the two arms 11, 12 to create a time-and polarization quantum transmitter. The output of the beam splitter 20 is then connected to a single mode fiber 110 for the transmission in the quantum channel 3.

The above applies with any dimensionality p chosen for the time-bin encoding, that is, the above does not change if the bases of FIG. 5 are selected. In this case, the group G has more sub-pulses which are manipulated by the second and third intensity modulators 13, 14 and their relative phases by the first and second phase modulators 15, 16.

In the present invention, also the degree of freedom of the path can be used. An example of a basis in this degree of freedom, combining time of arrival and path degrees of freedom, is the couple of bases of FIG. 7. The path degree of freedom is used preferably with multi-core fiber 120 or multi-mode optical fiber 130. In this case, the first arm of the beam splitter 10 is connected to a first core (mode) of the optical fiber 120 (130) and the second arm of the beam splitter is connected to a second core (mode) of the optical fiber 120 (130).

If more than two cores are present in the optical fiber (or more than two modes), a switch may be present (not depicted in the drawings) to select in which core (mode) to input the quantum states coming from the arms of the beam splitter.

For example, a combination of a p-dimensional time-bin scheme with path encoding technique for multicore or multimode fiber is possible. The creation of the p-dimensional time-bin encoding is the same as depicted with transmitter 1 or 50. Further, preferably, a phase shift between the two arms, the first and the second arm 11, 12 of the beam splitter 10, is generated in some of the quantum states. The phase shift needs to be generated to differentiate the two superposition states $|A+B\rangle$ and $|A-B\rangle$. For example, if p=2, time and path can be combined to generate a 4-dimensional quantum signal. The first arm 11 is connected to a first core (mode) of the multicore (multimode) fiber and the second arm 12 is connected to a second core (mode). In this way, the transmitter is able to generate an N-dimensional quantum state in time and path.

Figures 16A, 16B, 16C:
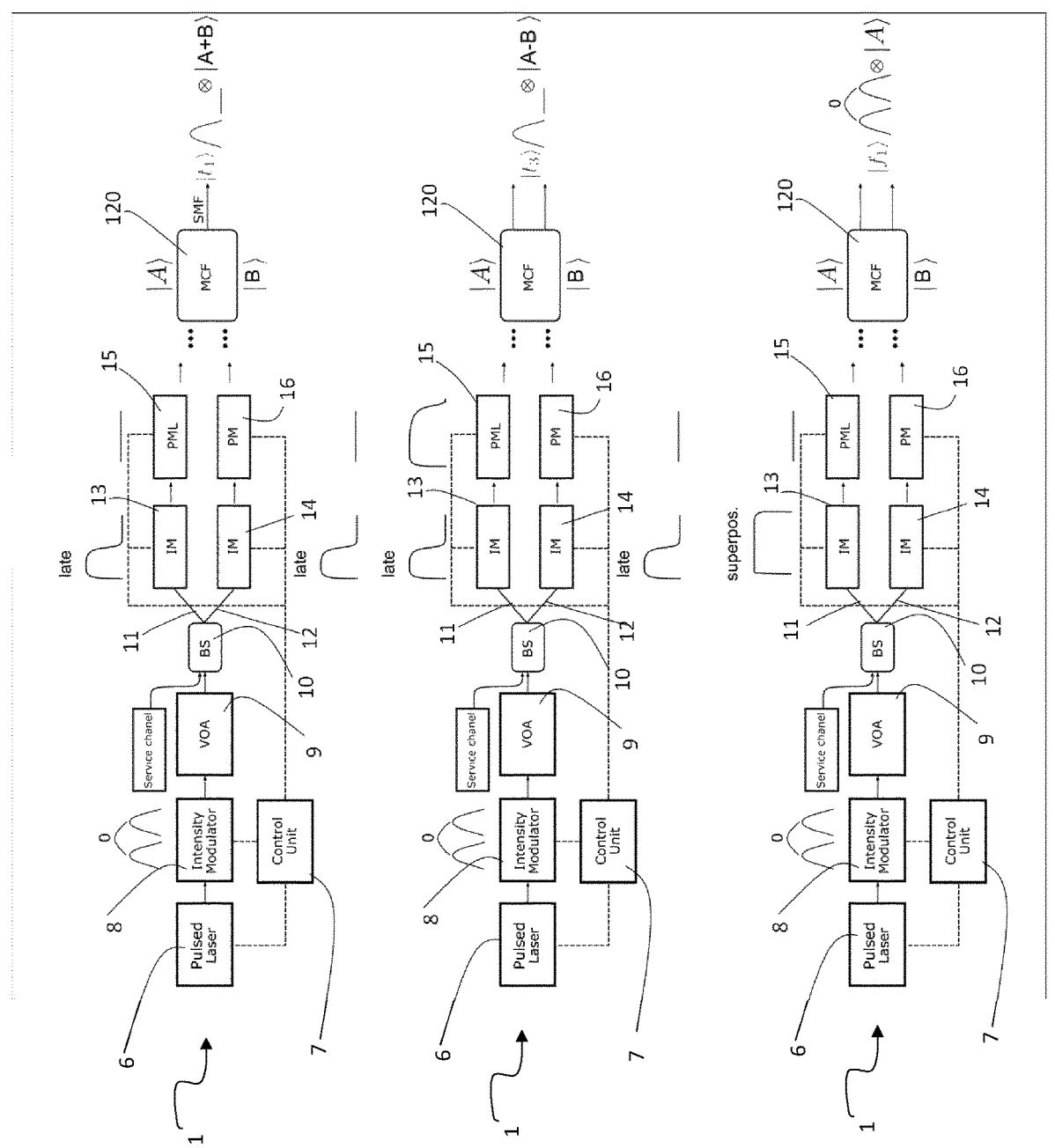
FIG. 16*a*-FIG. 16*c* show a third embodiment of the transmitter of FIG. 11 generating a first, a second and a third quantum state.

This embodiment of an encoding in time and path is depicted in FIGS. 16a-16c. In this embodiment, the transmitter 1 is connected with the first arm 11 to path A (one of the cores of multi-core optical fiber 120) and with the second arm to path B (another one of the cores of multi-core optical fiber 120). In order to form basis X of FIG. 7, only one of the two arms 11, 12 is used. At the beam splitter 10, a group of 2 sub-pulses is divided in two split groups of 2 sub-pulses each, one travelling in first arm 11 and the other travelling in the second arm 12. If the first quantum state in the X basis of FIG. 7 is desired, $|f_1>$, then the quantum state is prepared by the first arm 11 as follows. When the split group enters the second intensity modulator 13, the electric signal from the control unit 7 forces the second intensity modulator 13 (see the signal above the intensity modulator 13 in FIG. 16c) to reduce the amplitude of the sub-pulses travelling in the respective arm to half of the original amplitude. This results in the quantum state with a superposition of photons. In the second arm 12, the third intensity modulator 14 suppresses the group, thus reaching the "vacuum state". The result in therefore a superposition signal in time travelling in path A (state $|f_1>$). This is shown in FIG. 16c. The same applies for the formation of $|f_3>$, reversing the role of the first arm and second arm. At the beam splitter 10, a group of 2 sub-pulses is divided in two split groups of 2 sub-pulses each, one travelling in first arm 11 and the other travelling in the second arm 12. If the third quantum state in the X basis of FIG. 7 is desired, $|f_3>$, then the quantum state is prepared by the second arm 12 as follows. When the split group enters the third intensity modulator 14, the electric signal from the control unit 7 forces the third intensity modulator 14 to reduce the amplitude of the sub-pulses travelling in the respective arm to half of the original amplitude. This results in the quantum state with a superposition of photons. In the first arm 11, the second intensity modulator 13 suppresses the group, thus reaching the "vacuum state". The result in therefore a superposition signal in time travelling in path B (state $|f_3>$).

In order to obtain states $|f_2>$ and $|f_4>$, the same operations performed to obtain states $|f_1>$ and $|f_3>$ are repeated, respectively. In addition, in order to obtain state $|f_2>$, the first phase modulator 15 acts on the split group travelling in the first arm 11 imposing a phase shift. In the same way, in order to obtain state $|f_4>$, the second phase modulator 16 acts on the split group travelling in the second arm 12 imposing a phase shift.

In order to form the Z basis, the transmitter 1 operates as follows. For quantum state $|t_1>$ of FIG. 7, both arms 11, 12 contribute to the state. At the beam splitter 10, a group of 2 sub-pulses is divided in two split groups of 2 sub-pulses each, one travelling in first arm 11 and the other travelling in the second arm 12. If the first quantum stats of FIG. 7 is desired, $|t_1>$, then the quantum state is prepared by the first arm 11 and the second arm 12 as follows. In the first arm 11, when the split group enters the second intensity modulator 13, the electric signal from the control unit 7 forces the second intensity modulator 13 (see the signal above the intensity modulator 13 in FIG. 16a) to transform such a group in the quantum state with a photon in the "late" bin. The first phase modulator 15 does not change the phase of the split group. In the second arm 12, when the split group enters the third intensity modulator 14, the electric signal from the control unit 7 forces the third intensity modulator 14 (see the signal above the intensity modulator 14 in FIG. 16a) to transform such a group in the quantum state with a photon in the "late" bin. The second phase modulator 16 does not change the phase of the split group. These two "late" quantum states in the first and in the second arm are injected in the first and second core of the multi-core fiber 130, that is, in path A and in path B. In the multi-core fibers therefore, there is an interference between these two quantum states and a superposition of the two quantum states in the two path takes place, that is, a quantum state $|A+B>$ as shown in FIG. 16a. Thus, the resulting signal is a quantum state in two degrees of freedom, in a "late" bin and superposition "+" in path.

The same as above applies in order to form the quantum state $|t_2>$ of FIG. 7. At the beam splitter 10, a group of 2 sub-pulses is divided in two split groups of 2 sub-pulses each, one travelling in first arm 11 and the other travelling in the second arm 12. If the second quantum stats of FIG. 7 is desired, $|t_2>$, then the quantum state is prepared by the first arm 11 and the second arm 12 as follows. In the first arm 11, when the split group enters the second intensity modulator 13, the electric signal from the control unit 7 forces the second intensity modulator 13 to transform such a group in the quantum state with a photon in the "early" bin. The first phase modulator 15 does not change the phase of the split group. In the second arm 12, when the split group enters the third intensity modulator 14, the electric signal from the control unit 7 forces the third intensity modulator 14 to transform such a group in the quantum state with a photon in the "early" bin. The second phase modulator 16 does not change the phase of the split group. These two "early" quantum states in the first and in the second arm are injected in the first and second core of the multi-core fiber 120, that is, in path A and in path B. In the multi-core fiber, therefore there is an interference between these two quantum states and a superposition of the two quantum states in the two path takes place, that is, a quantum state $|A+B>$. Thus, the resulting signal is a quantum state in two degrees of freedom, in an "early" bin and superposition "+" in path.

The formation the quantum state $|t_3>$ of FIG. 7 is now detailed. At the beam splitter 10, a group of 2 sub-pulses is divided in two split groups of 2 sub-pulses each, one travelling in first arm 11 and the other travelling in the second arm 12. If the third quantum stats of FIG. 7 is desired, $|t_3>$, then the quantum state is prepared by the first arm 11 and the second arm 12 as follows. In the first arm 11, when the split group enters the second intensity modulator 13, the electric signal from the control unit 7 forces the second intensity modulator 13 to transform such a group in the quantum state with a photon in the "late" bin. The first phase modulator 15 then change the phase by a given phase shift of the only remaining bin (for example by n). In the second arm 12, when the split group enters the third intensity modulator 14, the electric signal from the control unit 7 forces the third intensity modulator 14 to transform such a group in the quantum state with a photon in the "late" bin. The second phase modulator 16 does not change the phase of the split group. These two "late" quantum states in the first and in the second arm are injected in the first and second core of the multi-core fiber 120, that is, in path A and in path B. There is a phase shift of n between the two quantum states propagating in the two paths. In the multi-core fiber, there is an interference between these two quantum states and a superposition of the two quantum states in the two path takes place, that is, a quantum state $|A-B>$. Thus, the resulting signal is a quantum state in two degrees of freedom, in a "late" bin and superposition "−" in path. This is shown in FIG. 16b.

The formation the quantum state $|t_4\rangle$ of FIG. 7. At the beam splitter 10, a group of 2 sub-pulses is divided in two split groups of 2 sub-pulses each, one travelling in first arm 11 and the other travelling in the second arm 12. If the fourth quantum stats of FIG. 7 is desired, $|t_4\rangle$, then the quantum state is prepared by the first arm 11 and the second arm 12 as follows. In the first arm 11, when the split group enters the second intensity modulator 13, the electric signal from the control unit 7 forces the second intensity modulator 13 to transform such a group in the quantum state with a photon in the "early" bin. The first phase modulator 15 then change the phase by a given phase shift of the only remaining bin (for example by n). In the second arm 12, when the split group enters the third intensity modulator 14, the electric signal from the control unit 7 forces the third intensity modulator 14 to transform such a group in the quantum state with a photon in the "early" bin. The second phase modulator 16 does not change the phase of the split group. These two "early" quantum states in the first and in the second arm are injected in the first and second core of the multi-core fiber 120, that is, in path A and in path B. There is a phase shift of n between the two quantum states propagating in the two paths. In the multi-core fiber, there is an interference between these two quantum states and a superposition of the two quantum states in the two path takes place, that is, a quantum state $|A-B\rangle$. Thus, the resulting signal is a quantum state in two degrees of freedom, in an "early" bin and superposition "−" in path.

Preferably, in the configuration where a combination of time of arrival and path is used, one of the two arms 11, 12 of the beam splitter 10 is directly connected to one core or mode of the optical fiber 120, 130. The other arm 12, 11 undergoes a phase stabilization.

Figure 15:
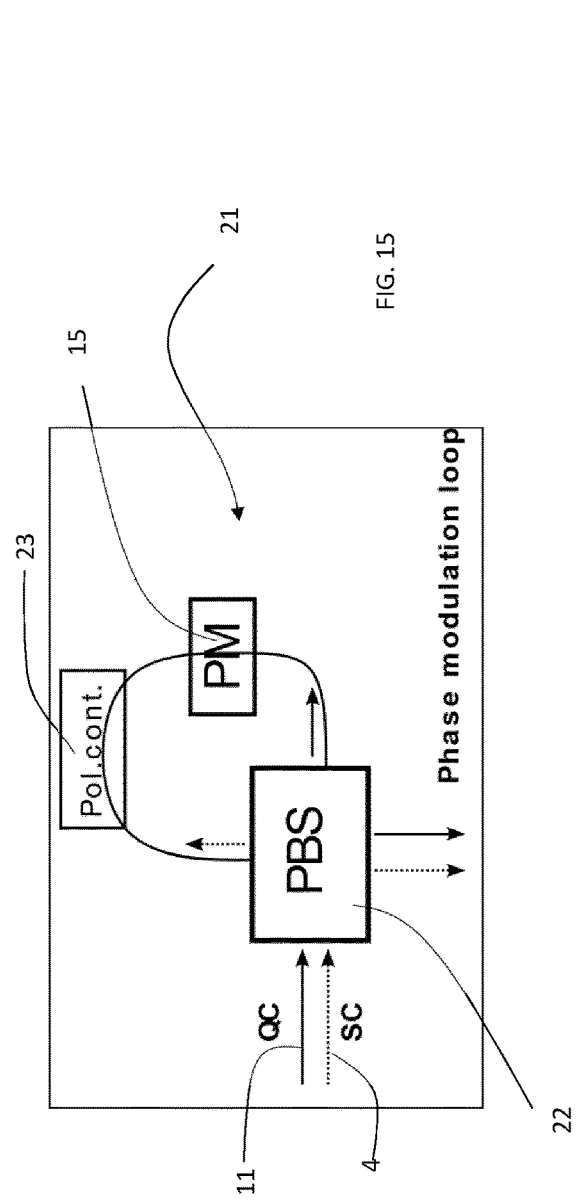
FIG. 15 shows a different detail of the transmitter of FIG. 11.

The phase stabilization is depicted in FIG. 15. As an example here, the second arm 12 is connected directly to a core/mode of the optical fiber 120, 130, while the first arm 11 is undergoing the stabilization. In particular the group of p sub-pulses enter in phase-modulation loop (PML) which modulates the phase either between the consecutive sub-pulses (in the same time-bin) or between cores/modes of a multicore/multimode fiber. To be more precise, in the case of the canonical computational basis (the Z basis in FIG. 7), the PML actively modulates the phase between arms (path or modes) and is used at a first repetition rate, as an example a repetition rate of 1 GHz. On the contrary, in the superposition basis (X basis), the PML controls the phase between pulses in the same time-bin and receive an electrical signal with a second repetition rate, for example a repetition rate of 8 GHZ.

The phase modulating loop 21 of FIG. 15 receives as input the groups travelling in the first arm 11 and a stabilization signal from the service channel 4.

In order to be able to effectively phase modulate only the quantum channel while both signals propagate through the same fiber paths, the polarization dependence of phase modulator crystals is used. The first phase modulator 15 includes a phase modulator crystal. By orienting the polarization of the stabilization signal orthogonally to the modulation axis of the phase modulator, the output is poorly affected by the modulation. The quantum channel is for example vertically polarized at the input of a polarizing beam splitter (PBS) 22, whereas the stabilization signal is horizontally polarized. The phase modulating loop also includes a beam splitter 22 (PBS 22) that splits the two signals: the first is reflected while the second transmitted. By connecting the two outputs of the PBS, a loop in which the quantum signal travels in a counter-clockwise direction while the stabilization signal in a clockwise direction is obtained. To be noted that a fiber-PBS is preferably used: by design, at both outputs the signals will be aligned to the slow axis of the polarization maintaining fibers. As the first phase modulator 15 efficiently modulates only the mode aligned with the slow axis of the polarization maintaining fiber, it is placed at the reflected output of the PBS 22. This ensures the correct modulation of the quantum channel. Contrariwise, on the other output of the PBS 22, the stabilization channel (also aligned to the slow axis) needs to be rotated to the orthogonal fast axis before it can be sent through the first phase modulator 15 to avoid modulation. This rotation can be achieved by inserting in the loop a polarization controller 23. Hence, when the two channels reach the PBS after one loop, they are both directed to the secondary input of the PBS.

The invention claimed is:

1. A quantum key distribution transmitter for sending a cryptographic key via a quantum channel using a N-dimensional protocol, wherein the N dimensional protocol includes a p-dimensional time-bin protocol, the transmitter comprising:

a pulsed laser configured to emit a train of laser pulses, each pulse having a random phase with respect to the phase of the following pulse in the train, the pulsed laser being a gain-switched pulsed laser or a direct modulated laser;

a first intensity modulator configured to divide a pulse of the train of pulses in a group of p consecutive sub-pulses identical to each other;

a variable optical attenuator configured to reduce the intensity of each sub-pulse of the group of p consecutive sub-pulses;

a beam splitter comprising a first arm and a second arm, the beam splitter being configured to receive the group of p sub-pulses and split the group of p sub-pulses in a first and second split groups of p sub-pulses identical to each other in the first and second arm;

wherein the first arm comprises a second intensity modulator and a first phase modulator configured to modify at least one of the intensity or the phase of the sub-pulses of the first split group, and the second arm comprises a third intensity modulator and a second phase modulator configured to modify at least one of the intensity or the phase of the of the sub-pulses of the second split group, to generate, in at least one of the first arm and second arm, quantum states according to the p-dimensional time-bin protocol.

2. The transmitter according to claim 1, further comprising a beam combiner and wherein the first arm and the second arm include a first polarizer and a second polarizer to polarize the first and second split groups of sub-pulses, respectively, according to a first and a second polarization axis, the first and second polarization axis being orthogonal, the first and second arm being connected to the beam combiner which combines the first and second split groups polarized along the first and second axis in a single signal comprising quantum states in a time-bin basis and in a polarization basis.

3. The transmitter according to claim 1, wherein the first intensity modulator is configured to divide a pulse of the train of pulses in a group of p consecutive sub-pulses identical to each other having a first amplitude which defines signal states and another pulse of the train of pulses in a group of p consecutive sub-pulses identical to each other having a second amplitude, different from the first amplitude, and defining decoy states.

4. The transmitter according to claim 1, wherein the first arm further comprises a phase modulating loop including the first phase modulator, the first phase modulator in the phase-modulating loop being configured to modulate the phase of the split group travelling in the first arm and not modulating a stabilization signal having a different wavelength than the split group.

5. The transmitter according to claim 1, wherein the pulsed laser is a direct modulated laser.

6. A kit comprising:
a transmitter comprising:
    a pulsed laser configured to emit a train of laser pulses, each pulse having a random phase with respect to the phase of the following pulse in the train, the pulsed laser being a gain-switched pulsed laser or a direct modulated laser;
    a first intensity modulator configured to divide a pulse of the train of pulses in a group of p consecutive sub-pulses identical to each other;
    a variable optical attenuator configured to reduce the intensity of each sub-pulse of the group of p consecutive sub-pulses;
    a beam splitter comprising a first arm and a second arm, the beam splitter being configured to receive the group of p sub-pulses and split the group of p sub-pulses in a first and second split groups of p sub-pulses identical to each other in the first and second arm;
    a beam combiner and wherein the first arm and the second arm include a first polarizer and a second polarizer to polarize the first and second split groups of sub-pulses, respectively, according to a first and a second polarization axis, the first and second polarization axis being orthogonal, the first and second arm being connected to the beam combiner which combines the first and second split groups polarized along the first and second axis in a single signal comprising quantum states in a time-bin basis and in a polarization basis
    wherein the first arm comprises a second intensity modulator and a first phase modulator configured to modify at least one of the intensity or the phase of the sub-pulses of the first split group, and the second arm comprises a third intensity modulator and a second phase modulator configured to modify at least one of the intensity or the phase of the of the sub-pulses of the second split group, to generate, in at least one of the first arm and second arm, quantum states according to the p-dimensional time-bin protocol;
    a single-mode fiber or underwater quantum channel or free space channel connected to the first arm or the second arm or to an output of the beam combiner.

7. A kit comprising:
a transmitter comprising:
    a pulsed laser configured to emit a train of laser pulses, each pulse having a random phase with respect to the phase of the following pulse in the train, the pulsed laser being a gain-switched pulsed laser or a direct modulated laser;
    a first intensity modulator configured to divide a pulse of the train of pulses in a group of p consecutive sub-pulses identical to each other;

a variable optical attenuator configured to reduce the intensity of each sub-pulse of the group of p consecutive sub-pulses;
    a beam splitter comprising a first arm and a second arm, the beam splitter being configured to receive the group of p sub-pulses and split the group of p sub-pulses in a first and second split groups of p sub-pulses identical to each other in the first and second arm;
    wherein the first arm comprises a second intensity modulator and a first phase modulator configured to modify at least one of the intensity or the phase of the sub-pulses of the first split group, and the second arm comprises a third intensity modulator and a second phase modulator configured to modify at least one of the intensity or the phase of the of the sub-pulses of the second split group, to generate, in at least one of the first arm and second arm, quantum states according to the p-dimensional time-bin protocol; and
a multi-mode or a multi-core optical fiber, wherein the first arm is connected to a first mode or a first core of the multi-mode or multi-core optical fiber and the second arm is connected to a second mode or a second core of the multi-mode or multi-core optical fiber.

8. A method to transmit a quantum key via a quantum channel using a N-dimensional protocol, wherein the N dimensional protocol includes a p-dimensional time-bin protocol, the method comprising:
    selecting a dimensionality p of the time-bin protocol;
    emitting a train of laser pulses having random phase one with respect to the other;
    dividing a pulse of the train of pulses in p consecutive sub-pulses identical to each other forming a group of p sub-pulses;
    lowering an amplitude of each sub-pulse of the group;
    splitting the group of p sub-pulses in first and second split groups of p sub-pulses identical to each other travelling in identical first and second optical paths;
    modulating at least one of an intensity or a phase of the sub-pulses of at least one of the first or second split group of p sub-pulses, to generate quantum states according to the p-dimensional time-bin protocol.

9. The method according to claim 8, further comprising connecting the first or the second path to a single mode optical fiber so that the quantum states can travel in the single mode optical fibers.

10. The method according to claim 8, further comprising polarizing the split group along a first polarization axis and the second split group along a second polarization axis, the first and the second polarization axis being orthogonal to each other, combining the first split group polarized along the first axis and the second split group polarized along the second axis in a single signal to form quantum states in the time-bin and polarization encoding.

11. The method according to claim 8, further comprising connecting the first path to a first core of a multi-core optical fiber and connecting the second path to a second core of a multi-core optical fiber, or connecting the first path to a first mode of a multi-mode optical fiber and connecting the second path to a second mode of a multi-mode optical fiber.

12. The method according to claim 8, further comprising:
    providing a stabilization signal having a wavelength different than a wavelength of the pulses of the train;
    propagating the stabilization signal through the first and second path;

modulating the phase of the split group and at the same time not modulating the phase of the stabilization signal travelling the same path of the split group.

\* \* \* \* \*